July 13, 1926.
S. GADE
1,592,353
BATH FIXTURE
Filed April 19, 1926   2 Sheets-Sheet 1
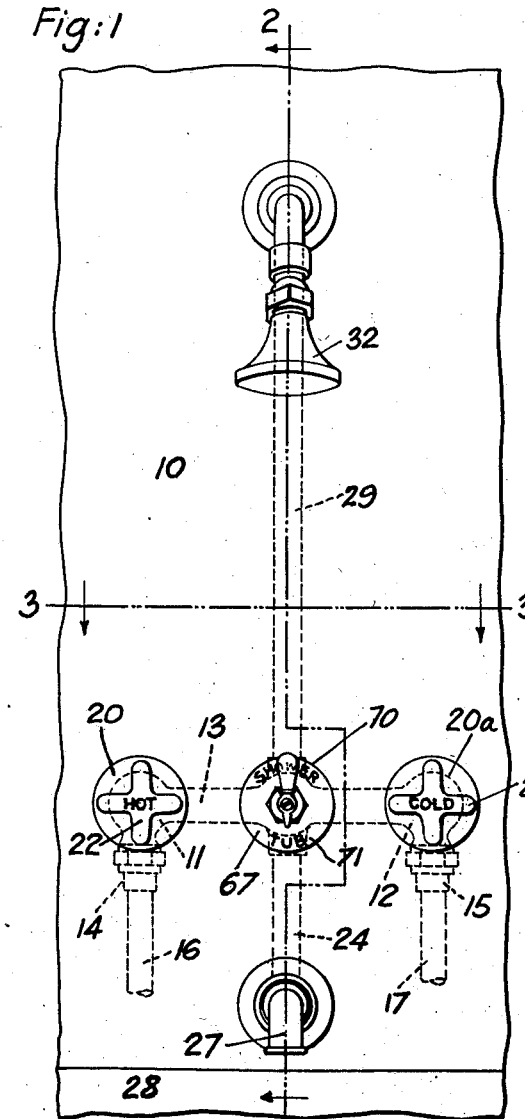
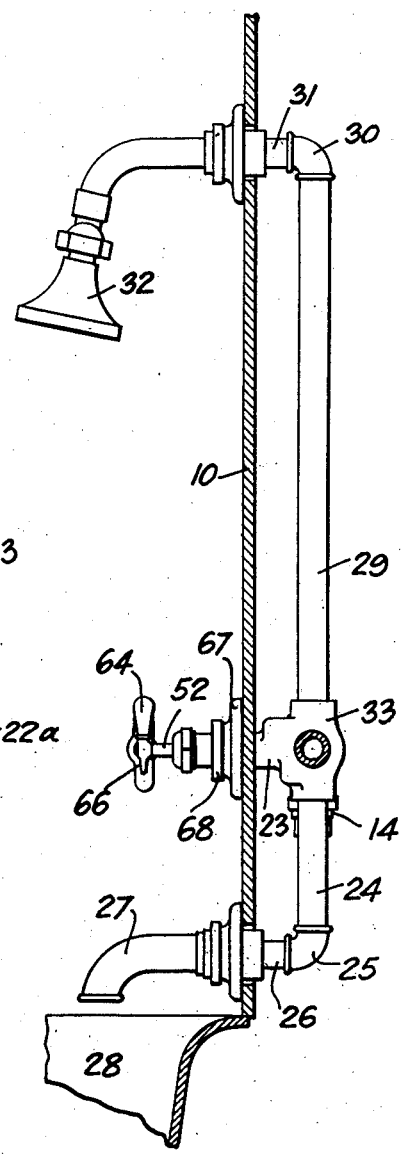
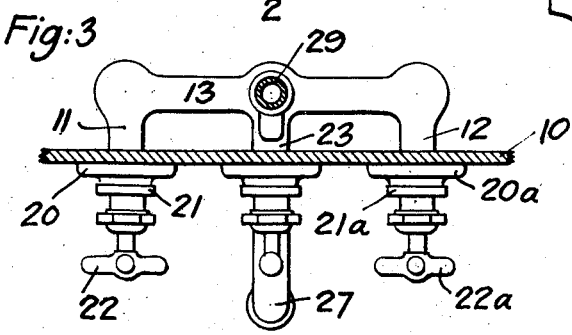
SAMUEL GADE
INVENTOR
BY Walter E. Wallheim
ATTORNEY July 13, 1926.　　　　　　　　　　　　　　1,592,353
S. GADE
BATH FIXTURE
Filed April 19, 1926　　2 Sheets-Sheet 2
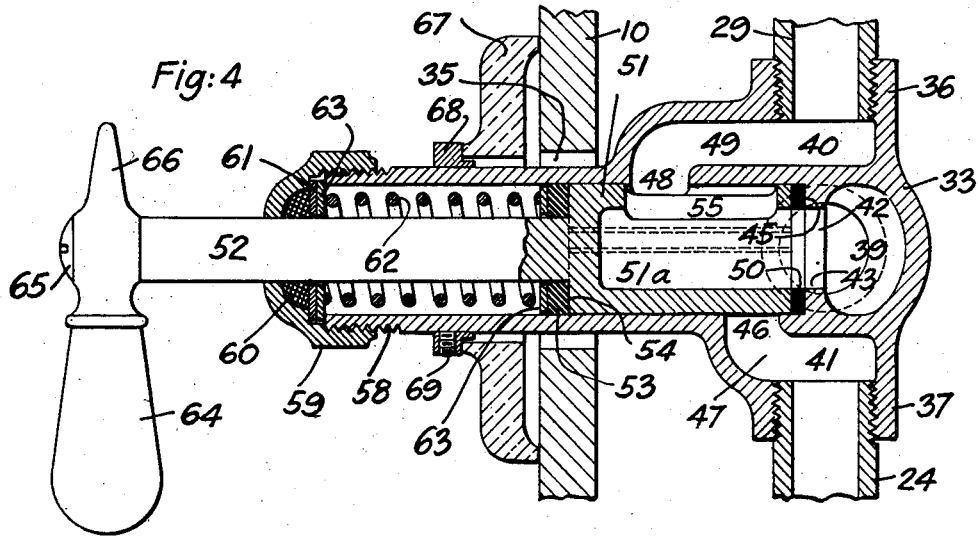
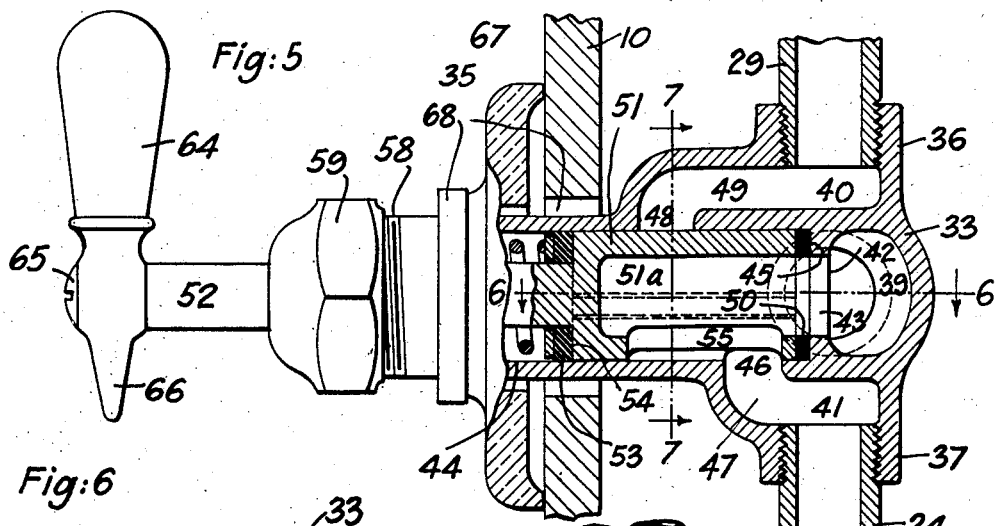
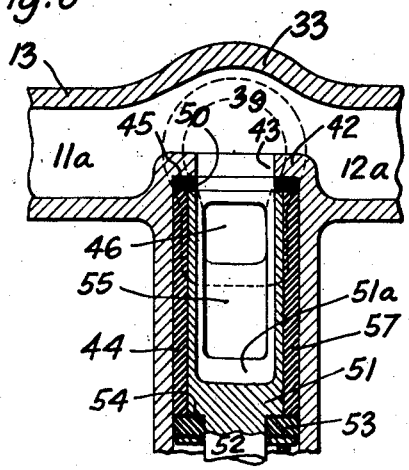
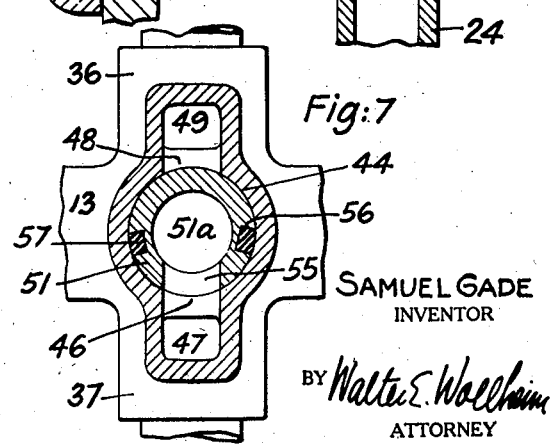
SAMUEL GADE
INVENTOR
BY Walter E. Wallheim
ATTORNEY Patented July 13, 1926.

1,592,353

UNITED STATES PATENT OFFICE.

SAMUEL GADE, OF NEW YORK, N. Y.

BATH FIXTURE.

Application filed April 19, 1926. Serial No. 102,989.

This invention relates to improvements in bath fixtures and more particularly to control valves for the admission of hot or cold water to bath tubs and showers.

Heretofore, mixing valves were employed in connection with independent hot and cold water supply valves, the regulating of the temperature being effected by the mixing valves, the supply valves being used for shut-off purposes only, or additional individual valves were used to regulate for temperature.

These constructions proved to be unsatisfactory on account of certain objectionable features, among which was outstanding the fact that the user could not ascertain the temperature of the water issuing from the shower head except by actual regulation during which he was subject to being scalded by water of too high a temperature or shocked by the water being too cold. To overcome this, there has come in use lately a valve structure which is employed in connection with independent hot and cold water supply valves which permits the water to discharge from a spout into the bath tub where the right temperature for the shower may be determined by regulation of the supply valves. As soon as this temperature is satisfactorily ascertained, by giving the valve handle a one-half turn, the water from the spout is diverted therefrom to the shower head. A construction of this kind is set forth in applicant's Patent #1,566,273, issued to him on December 22, 1925.

It is the object of the invention to provide a structure for a valve for this purpose which is simple in design, can be manufactured economically, and is particularly well adapted to be used with a simplified arrangement of hot and cold water supply connections whereby a number of joints can be eliminated.

Further objects and advantages of the invention will become apparent in the following specifications and the accompanying drawings, in which—

Fig. 1 is an elevational view showing a set of bath fixtures comprising a hot water and cold water supply control valve, or so-called "primary" valves, a shower head, a water outlet spout for a bath tub, and a water diverting valve or so-called "secondary" valve;

Fig. 2 is a partial side view and section substantially along the plane of line 2—2 in Fig. 1;

Fig. 3 is a cross sectional view along the plane of line 3—3 in Fig. 1;

Fig. 4 is a longitudinal sectional view through the secondary valve in a position of diverting water to the shower head;

Fig. 5 is a similar view, but in a position of diverting water to the spout discharging water into the tub;

Fig. 6 is a cross sectional view along the plane of line 6—6 in Fig. 5; and

Fig. 7 is a cross sectional view along the plane of line 7—7 in Fig. 5.

Like characters of reference denote similar parts throughout the several views and the following specification.

10 is a wall in a bath room to which is secured a hot water supply control valve 11 and a cold water supply control valve 12. These valves, already referred to as primary valves have a common main housing 13 concealed behind the wall 10, and union connections 14 and 15 to connect with, respectively, a hot water supply pipe 16 and a cold water supply pipe 17. Valves 11 and 12 are secured to the wall by means of the usual escutcheons 20 and 20$^a$ and lock nuts 21 and 21$^a$ in the customary manner. The handles 22 and 22$^a$ of these valves are marked, respectively, "Hot" or "Cold".

Midway between control valves 11 and 12 in the housing 13 is a water diverting or secondary valve 23. Below the valve 23, connected to the housing 13, is a pipe 24 which by means of an elbow 25 and nipple 26 is connected to a water spout 27 adapted to discharge water into a bath tub 28 of which a fragmentary section is shown in Fig. 2. Pipe 24 is hereinafter referred to as "tub pipe". Above the valve 23, also connected to the housing 13, is a pipe 29 which by means of an elbow 30 and nipple 31 is connected to a shower head 32 suitably secured to the wall 10. Pipe 29 will be called hereinafter "shower pipe".

I shall now explain more in detail the construction of the diverting or secondary valve 23. 33 is a valve housing proper which is an integral part of the main housing 13 and which partly projects into the room through an opening 35 in the wall 10. At the top of the housing is a cylindrical branch 36, tapped out to receive the shower pipe 29. At the bottom is provided a similar branch 37, preferably in central alignment with branch 36, threaded interiorly for the tub pipe 24. The interior of the housing 33 is divided into three distinct chambers, viz, an inlet chamber 39, a shower outlet chamber 40, and a tub outlet chamber 41. 42 is a wall separating chambers 39 and 41. 43 is a port opening through the wall 42, substantially at right angles to the axis of tub pipe 24 and shower pipe 29 which are in central alignment. The forward end of the housing 33 is provided with a smooth bore 44 of larger size than the port 43 but in central alignment therewith. 45 is a shoulder surrounding and immediately adjacent port 43 formed by the bore 44 where it abuts the wall 42. Inlet chamber 39 is in communication with the cold and hot water supply valves 11 and 12 by passages 11$^a$ and 12$^a$, respectively, within the housing 13 and with the bore 44 by means of port 43. Near the shoulder 45 in the lower side of bore 44 is an aperture 46 which communicates with the tub outlet chamber 41 by a passage 47 and thereby with the tub pipe 24. 48 is an aperture in the upper side of bore 44, but further removed frontwardly from the shoulder 45 which communicates by a passage 49 with the shower outlet chamber 40 and shower pipe 29. 50 is an annular fiber gasket surrounding port 43, its outer diameter being that of the bore 44. 51 is a plug valve rotatably fitted within the bore 44. Plug valve 51 is bored out in its center at 51$^a$ approximately the size of port 43, its open end surrounding this port and fitting snugly and fluid tightly against gasket 50. The front end of the plug valve is reduced in diameter to form a valve spindle 52 which projects outwardly of the housing 33. 53 is an annular leather gasket fitted around valve spindle 52 at a shoulder 54 formed by the difference in diameters of spindle 52 and plug valve 51. 55 is an oblong slot through the wall of plug valve 51 of such a length that the same will register with aperture 46 in one position and with aperture 48 when given a one-half turn around its axis. 56, are U-shaped grooves, longitudinally disposed, at both sides of the slot 55 into which leather strips 57 are placed which contact with, respectively, fiber gasket 50 at one end and leather gasket 53 at the other, and with the wall of bore 44 throughout their entire lengths. The extreme end of the housing 33 projecting into the bath room through opening 35 in the wall 10 is threaded exteriorly at 58. 59 is a packing nut over this threaded end, fitted around the spindle 52. 60 is a molded packing around the spindle within the nut 59. 61 is a fiber washer against packing 60. 62 is a metal spring around the valve spindle 52 within the bore 44 of the housing, resting against metal washers 63 and pressing the leather gasket 53 against the plug valve 51, and plug valve 51 against fiber gasket 50 which also causes fluid tight contact between the ends of leather strips 57 and the gaskets and the sides of the strips and the inner wall of bore 44. 64 is a handle fastened to the spindle 52 by means of a screw 65, and 66 is an indicator pin forming part of the handle 64. 67 is an escutcheon or shield over the inwardly projecting part of the housing 33 which is held against the wall 10 to cover opening 35 by means of a lock nut 68 fastened to housing 33 by a screw 69. As shown in Fig. 1, escutcheon 67 is marked at 70 "Shower" and diametrically opposite at 71 "Tub."

The operation of the device is as follows:

The handle 64 of the valve spindle 52 is set as shown in Fig. 1 with the indicator pin 66 pointing downwardly toward the tub over the designation "Tub" on the escutcheon 67. In this position which is also illustrated in Fig. 5, the valve port 43 affords communication between inlet chamber 39 and tub outlet chamber 41 through slot 55, while the closed wall of plug valve 51 shuts off the shower outlet chamber 40. Hot and cold water valves 11 and 12 are then opened and the water supplied from pipes 16 and 17 admitted into passages 11$^a$ and 12$^a$ of the housing 13 and thence into inlet chamber 39, whence it passes through port 43, slot 55, aperture 46, duct 47 into the tub outlet chamber 41 and through tub pipe 24 and water spout 27 into the tub 28. By regulating valves 11 and 12 a hotter or colder mixture of water is obtained in the customary manner.

Should I now wish to employ the shower, I simply give the valve spindle 52 a one-half turn around, so as to bring its handle 64 in a position in which the indicator 66 points upwardly toward the shower over the marking "Shower" on the escutcheon. In this position which is shown in Fig. 4, the plug valve 51 shuts off aperture 46 and the tub outlet chamber 41 and exposes aperture 48, thereby diverting the water from port 43 through aperture 48, passage 49 into the shower outlet chamber 40 and thence through shower pipe 29 out through the shower head 32.

It will be clearly seen that through manipulation of the valves 11 and 12, as explained, the proper mixture of the water can be ascertained at the spout outlet to the tub and as soon as satisfactorily determined can be diverted to the shower, without the user being injured by water of either too high or too low a temperature, and that any splashing incidental to testing the water directly from the shower head is entirely eliminated.

Attention is particularly drawn to the packing means around the slot 55 in the plug valve 51 proper. The spring 62 tightly presses against the leather gasket 53 which holds the plug 51 against fiber gasket 50 and simultaneously both ends of leather strips 57 against, respectively, gaskets 50 and 53, and the outer surfaces of the strips against the bore 44. By these means, any leakage of water whatever from inlet chamber 39 to either of outlet chambers 40 or 41 is eliminated, because no water through slot 55 can leak past strips 57 and gaskets 50 and 53. Gasket 50 is made of fiber to withstand better sudden changes in temperatures, while strips 57 and gasket 53 are found to be more effective and leak proof when made of leather.

While I have shown in the drawings and described in the specification a preferred embodiment of a valve structure embodying my invention, I wish it to be understood that various changes of form, proportions, minor details and combination of parts may be resorted to without departing from or sacrificing any of the advantages of the invention, as defined in the appended claims.

What I claim as new, is:

1. In a bath fixture for the purpose specified, a housing having a valved hot water connection at one end and a valved cold water connection at the other, a valve structure within the housing between the said hot and cold water connections, comprising a plug rotatably fitted within a cylindrical bore in the housing, the said plug being closed at one end and its open end surrounding a valve port in communication with the said hot and cold water connection, a shower outlet connection at the top of the housing connected to the said cylindrical bore by an aperture through its curved top wall, and a tub outlet connection at the bottom of the housing connected to the said cylindrical bore by an aperture through its curved bottom wall, the one aperture being further removed from the said valve port than the said other aperture, an oblong slot through the said plug adapted to register with one aperture while shutting off the other aperture, gaskets at both ends of the plug, packing strips in the outer wall of the plug at both sides of the said slot contacting with the said gaskets, and a spring to compress the said gaskets and packing strips for the purpose of preventing leakage of water from the valve port around the sides of the plug to that outlet connection which is closed by the said plug.

2. In a bath fixture for the purpose specified, a housing having a valved hot water connection at one end and a valved cold water connection at the other, a valve structure within the housing between the said hot and cold water connections, comprising a plug rotatably fitted within a cylindrical bore in the housing, the said plug being closed at one end and its open end surrounding a valve port in communication with the said hot and cold water connection, a shower outlet connection at the top of the housing connected to the said cylindrical bore by an aperture through its curved top wall, and a tub outlet connection at the bottom of the housing connected to the said cylindrical bore by an aperture through its curved bottom wall, the one aperture being further removed from the said valve port than the said other aperture, an oblong slot through the said plug adapted to register with one aperture while shutting off the other aperture, gaskets at both ends of the plug, packing strips in the outer wall of the plug at both sides of the said slot contacting with the said gaskets, and a spring to compress the said gaskets and packing strips for the purpose of preventing leakage of water from the valve port around the sides of the plug to that outlet connection which is closed by the said plug, a spindle forming part of the said plug projecting outwardly of the said housing, a handle having an indicator, and an escutcheon having markings thereon to show when the indicator is registered with the said markings which of the said outlet connections is in communication with the said valve port.

In testimony whereof I have hereunto set my hand and seal.

SAMUEL GADE. [L. S.]